United States Patent [19]

McDonough

[11] Patent Number: 5,938,338
[45] Date of Patent: Aug. 17, 1999

[54] RECYCLEABLE BULK BAG CONTAINERS

[75] Inventor: Kevin Colby McDonough, West Chester, Pa.

[73] Assignee: Rohm & Haas Company, Philadelphia, Pa.

[21] Appl. No.: 08/513,705

[22] Filed: Aug. 11, 1995

Related U.S. Application Data

[63] Continuation-in-part of application No. 08/303,990, Sep. 9, 1994, abandoned.

[51] Int. Cl.$^6$ .................................................. B65D 33/14
[52] U.S. Cl. ............................ 383/24; 383/113; 383/117; 220/495.06
[58] Field of Search ................................. 383/24, 41, 67, 383/105, 113, 117, 109; 220/404, 495.01, 495.06

[56] References Cited

U.S. PATENT DOCUMENTS

| | | |
|---|---|---|
| Re. 34,560 | 3/1994 | Schnaars . |
| 3,282,621 | 11/1966 | Peterson ................................ 383/67 X |
| 3,961,655 | 6/1976 | Nattrass et al. ....................... 383/67 X |
| 4,207,937 | 6/1980 | Sandeman et al. . |
| 4,300,608 | 11/1981 | Cuthbertson . |
| 4,597,102 | 6/1986 | Nattrass ............................... 383/113 X |
| 4,781,472 | 11/1988 | LaFleur et al. ...................... 383/105 X |
| 4,946,291 | 8/1990 | Schnaars . |
| 4,948,265 | 8/1990 | Futerman ............................ 383/117 X |
| 5,076,710 | 12/1991 | Derby . |

FOREIGN PATENT DOCUMENTS

| | | |
|---|---|---|
| 338181 | 5/1988 | European Pat. Off. . |
| 300539 | 7/1988 | European Pat. Off. . |
| 332333 | 3/1989 | European Pat. Off. . |
| 378829 | 12/1989 | European Pat. Off. . |

OTHER PUBLICATIONS

B.A.G. Corporation, F.I.B.C. Seminar Notebook. No Date.

*Primary Examiner*—Jes F. Pascua
*Attorney, Agent, or Firm*—Ronald S. Hermenau; Darryl P. Frickey

[57] ABSTRACT

Recycleable bulk bag containers having an exterior fabric layer and an interior fabric layer or interior film liner. Such bulk bag containers are used in the storage and transport of materials in powder, granular and other particulate forms. Such containers carry loads of up to one ton or more.

18 Claims, 2 Drawing Sheets

RECYCLEABLE BULK BAG CONTAINERS

This application is a continuation-in-part, of application Ser. No. 08/303,990, filed Sep. 9, 1994, now abandoned.

BACKGROUND OF THE INVENTION

The invention relates to recycleable bulk bag containers having an exterior fabric layer and an interior fabric layer or interior film liner. Such containers are used in the storage and transport of materials in powder, granular, pellet, bead and other particulate form, such as chemicals, foodstuffs, cement and so forth. Such containers carry loads of up to one ton or more and desirably have a considerable safety margin above one ton.

In the art of transporting of dry, free-flowing bulk materials such as powders, granulars, and other particulates such as sugar, flour, plastic additives, mined ores or plastic molding powders, the use of bulk bags are well known to the industry, with such bags commonly having an upper receiving means for receiving contents within the bag. The bag is then transported after being filled and a lower discharge outlet which would be sealed during transport is opened into a receiving bin after transport, and the contents would be poured therefrom through the discharge outlet. In addition, fabric bulk bags may be required to have an inner polyethylene liner for moisture control, or contamination control, or to meet governmental requirements, such as food products that must be sealed within the polyethylene liner for purpose of purity as opposed to a plain fabric bag.

Bulk bag containers are frequently made from woven fabric, for example, woven polypropylene or another synthetic material. The woven fabric may be sealed by application of a coating layer of polypropylene or polyethylene. Bulk bag containers commonly have a plastic film liner of polyethylene inside the woven fabric layer of the bulk bag container. Bulk bag containers usually have lifting loops attached to the main body of the container, and points of attachment become regions of high stress. Similarly, seams between adjacent portions of the container become regions of high stress concentration, especially at lower portions of the container where there is an increased tendency of the woven fabric to elongate adjacent to the seams, and where seams do not tear, there is additional space which allows for powdery substances to leak through seams. This leakage presents environmental problems, cleanliness problems, product loss problems, dust explosion problems and breathing disorder problems for the user. Recycleability of bulk bag containers avoids environmental waste and the need to landfill the bulk bag after a single use.

Similarly, bulk bag containers made of woven polypropylene fabric and an interior polyethylene film liners present recycling problems due to the multiple plastic components. Such bulk bag containers need to have the liners seperated from the polypropylene fabric prior to recycling. Even after removal of the polyethylene liner from the bulk bag containers, portions of the polyethylene liner remain between seams of the bulk bag containers where the liner was stitched or sewn or glued into the bulk bag container. In addition, where glue is used to make a bulk bag, the glue can be a contaminant to the recycling process.

Another problem with bulk bag containers exists regarding stacking stability. When air is trapped within a sealed liner of a bulk bag, the bulk bag container becomes very unstable and will tip over. This instability occurs when both the fill spout and discharge spout of a bulk bag liner are sealed. The present invention overcomes the instability problems associated with air inside a sealed liner of a bulk bag container.

Attempts to overcome the leaking problems associated with bulk bag containers have focused on bulk bags with a polyethylene liner as disclosed in U.S. Pat. No. 4,946,291.

The problems addressed by this invention is the provision of a bulk bag container which is fully recycleable, leak proof to powdery substances, and stable when stacked.

STATEMENT OF THE INVENTION

This invention overcomes bulk bag container problems regarding recycleability, leakage of powdery substances and stacking instability. It has been found that by incorporating a polypropylene film liner within a polypropylene woven bulk bag container that these problems are overcome. Similarly, inserting a second or inner polypropylene woven bulk bag, in place of the polypropylene liner, within a polypropylene woven bulk bag container also overcomes the problems. Namely, a recycleable bulk bag container comprising: (a) a bag of woven polypropylene fabric having walls, a top panel, and a bottom panel; (b) an inner polypropylene film liner; and (c) lifting means attached to the walls; or, a recyleable bulk bag container comprising: (a) an outer bag of woven polypropylene fabric having walls, a top panel and a bottom panel; (b) an inner bag of woven polypropylene fabric having walls, and a bottom panel; and (c) lifting means attached to the walls of the outer bag.

DETAILED DESCRIPTION

Figure 1:
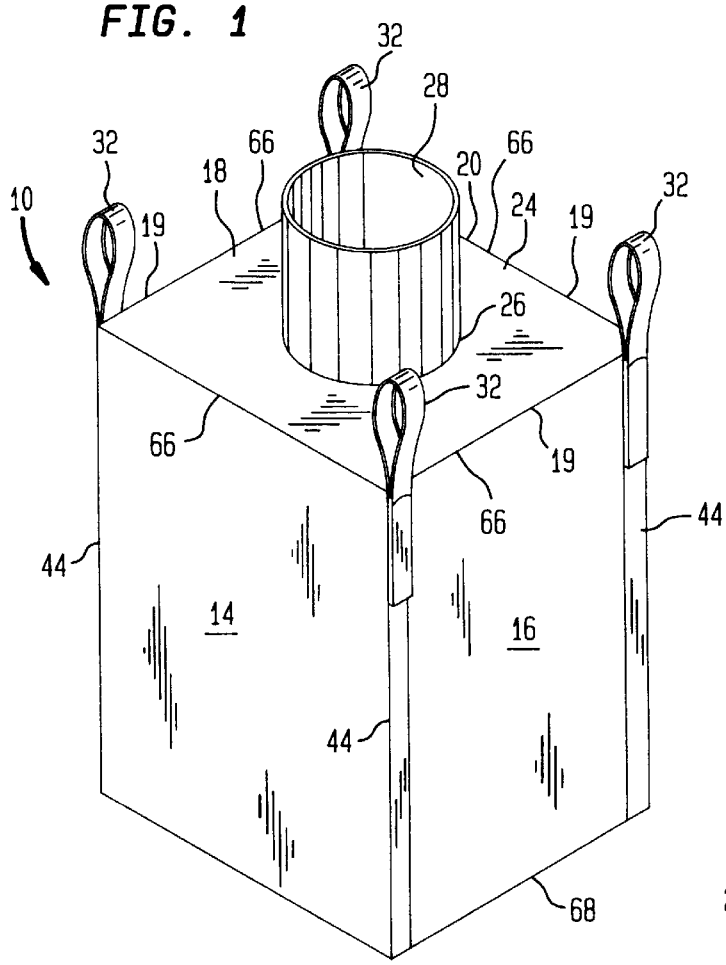
FIG. 1 is a front view of the bulk bag container.

Construction of bulk bag containers has been disclosed in various U.S. Pat. Nos. such as 4,207,937, 4,300,608, 4,946,291, and 5,076,710.

In general, the bulk bag container may be made from a plurality of fabric panels, from a single strip of fabric suitably folded, or a woven tube of fabric. It is generally desirable that higher warp strength regions are provided adjacent both selvedges of a fabric panel or strip.

Advantageously, the container may be designed so that as many of its seams as possible extend along selvedges, or at least those seams which will be subjected to the highest stress concentration in use, or that minimal seams exist.

In a construction employing a plurality of fabric panels, which for ease of manufacture may be of constant width, the panels may be joined to one another along their selvedges to form an open top bag-like structure with the seamed selvedges extending generally vertically. One such construction may comprise three portions, one of which is U-shaped, the other two being connected across the open ends of the U-shaped portion, the curved bight of which forms the bottom of the container.

Joining of the fabric panels of bulk bag containers may be by any suitable means such as welding, adhesives or stitching (sewing), although stitching with polypropylene thread is preferred to eliminate contaminants for recycling purposes. Sewing provides for stronger construction than welding or adhesives, and will not delaminate or seperate like welds or adhesives when subjected to high temperatures such as 150–180° F., as occurs when a bulk bag container sits in a tractor trailer or when being transported.

Such a container may comprise a main body portion in the form of a seamless tube the warp threads of which are parallel to the axis of the tube, the regions of higher strength warp being spaced around the periphery of the tube, the tube being closed at one end or both ends and lifting means such as loops being fastened at the other end of the tube to the higher strength warp regions. Either or both ends may have spouts for filling or discharging of contents.

Lifting loops for example may be fastened to the body portions by attaching the ends of the strips of loop in material to radically projecting flanges on the body portion formed by pinching together the regions of the body portion with higher warp strength, the loop ends being attached to the opposite outside faces of the pinching portions. Alternatively opposite ends of a strip of material to form a loop may be fastened to the inside and the outside surfaces of the body portion.

The body portion may be closed at the bottom end or both ends by fitting a circular or square piece of material to the body portion and attaching it thereto, for example, by stitching the sides together.

The body member presents no longitudinal seam which would be weak points, and is simple to form to the reduced number of sewing operations.

The higher strength warp regions could be provided by using a higher density of warp threads, by using higher tenacity warp threads, or by a combination of the two. Warp threads of lower tenacity may be formed as flat polypropylene tape, and those of higher tenacity as twisted polypropylene tape, R.E.F. (roll emboss film) yarns or high tenacity multi-filament yarns.

It will be appreciated that by means of the suitable disposition of higher warp strength regions, it is possible to provide reinforcement adjacent a seam or the point of attachment of lifting means such as a loop, by means which are inherent in the production of the fabric of the container, rather than the design of the container itself. Of course, for additional strength, it is possible to combine the use of higher warp strength regions with other means of reinforcement, improved seam constructions and so forth.

Woven fabric for use in constructing the container may for example be in the form of a strip having stronger warp regions adjacent each selvedge, or elsewhere as appropriate, or for example in the form of a tube woven on a circular loom, with suitable regions of higher strength warp.

Aside from reinforcing seams or points of attachment for lifting loops or the like, the stronger warp regions may be employed to provide reinforcement along other lines of stress.

The woven fabric utilized to make the bulk bag is woven polypropylene, such as 3.0 to 8.0 ounce/square yard woven polypropylene. Preferably, the side panels and bottom panel use heavier woven fabric such as 5.5 ounce/square yard woven polypropylene and the top panel utilizes lighter woven fabrics such as 3.0 ounce/square yard woven polypropylene. Similarly, the fill spout and discharge spout also utilize lighter woven fabrics. Typically the top panel, fill spout and discharge spout are coated with a polypropylene coating.

Referring to FIG. 1 is shown a bulk bag container 10 comprising four (4) side panels 14, 16, 18, and 20, seamed together along corner seams 44, and collectively known as walls. A top panel 24 is attached to the upper edges of the four side panels such that the corners 19 of the top panel 24 are attached at the seams 44.

For filling the bulk bag container an opening 26 is placed in the center of the top panel 24, through which a fill spout 28 extends for filling the bulk bag container. Lift straps 32 are attached to the four side panels along the seams 44, for lifting the bulk bag container 10. A bottom panel (not shown) is attached along the bottom edges of the four side panels, such that the corners of the bottom panel are attached to the seams 44. The construction of the bulk bag container 10 is such that, when filled, a substantial portion of the load is concentrated at the seams 44 and along the lift straps 32 (when lifted), thereby threatening the integrity of the filled bulk bag container 10.

Alternatively, the bulk bag container 10 may comprise three pieces of fabric, namely a substantially "U"-shaped portion, forming two sides and the bottom or base of the bag, and two rectangular pieces, forming the other two sides of the bag. A top panel 24 may be added to form the top of the container, resulting in a six panel bulk bag container. The fabric pieces are arranged with their warp threads running vertically up the sides of the bag. The pieces are joined by stitching along seams, for example, a blanket stitch using polypropylene yarn. The selvedges of the fabric pieces run vertically along the seams, except for at the base 68 or the top 66 of the bag. Alternatively, the bulk bag container 10, having six panels or six sides, may comprise two pieces of fabric, such as two substantially "U"-shaped portions, one portion forming two sides and a bottom, and the other portion forming two sides and a top. The pieces of fabric are stitched together along their seams by polypropylene yarn.

Alternatively, the bulk bag container 10 may have side panels made of circular woven polypropylene fabric.

When utilizing different fabric pieces for the sides, top and bottom of a bulk bag container, a bottom panel (not shown) is attached to the second end 68 of the four side panels in the same manner as the top panel 24 is attached to the first end 66 of the four side panels. The bottom panel (not shown) may have an opening in the center of the bottom panel similar to the fill opening 26 and the fill spout 28 in the top panel 24, which opening in the bottom panel may be used for the discharging of materials from the bulk bag container 10.

Typically, the fill spout 28 and the discharge spout 29 have closure means 31 such as web ties, cord locks, rope or tying means for tying closed the spouts.

Figure 2:
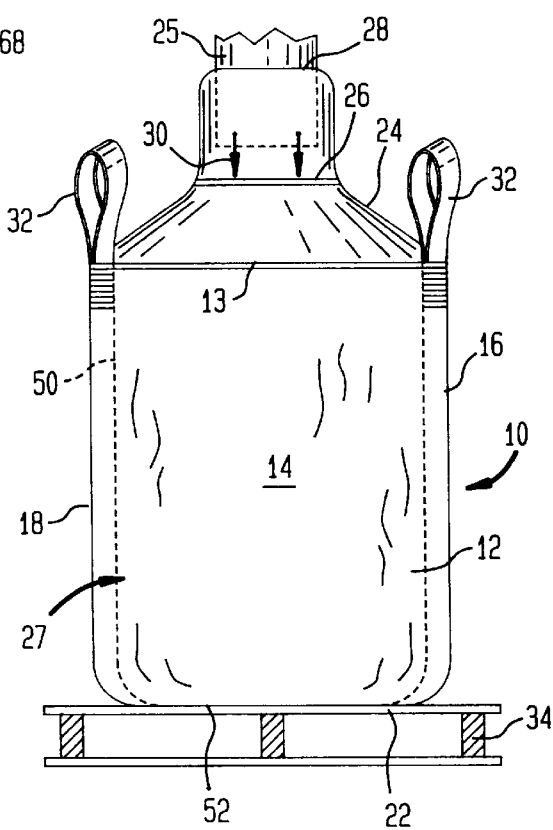
FIG. 2 is an overall side view of the bulk bag container having a liner of the present invention.
Figure 3:
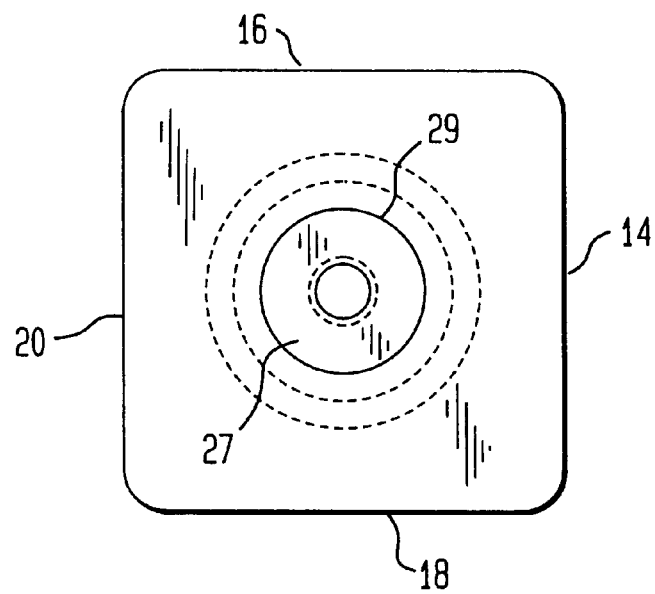
FIG. 3 is a bottom view of a bulk bag container having a liner of the present invention.
Figure 4:
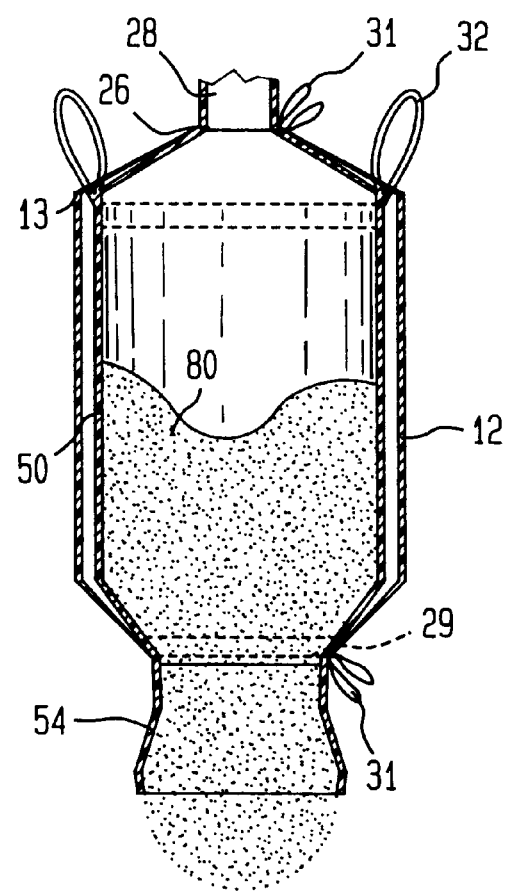
FIG. 4 is a cross sectional view of a bulk bag container while product contents are being dumped therefrom.

FIGS. 2–4 further illustrate the present invention. As seen in FIG. 2, the bulk bag container 10 would comprise an outer fabric bag 12, and when filled with bulk substantially comprising an upright bag having four side panels 14, 16, 18 and 20, collectively known as walls, and a substantially flat bottom panel 22 and a top panel 24, which can be in several forms such as, cone-shaped with a fill spout, flat-shaped with a fill spout, or full-open duffel style, having an upper open end 26 therein, the walls, bottom panel, and top panel of the bag defining an interior storage space 27 for storage of bulk materials. This bulk bag container allows for the flow of contents from a fill spout 28, with the contents flowing into the bag as indicated by arrows 30. Bulk bag container 10 would normally be comprised of a plain or coated woven fabric which could be sewn or adhered to form the bag itself having a lift strap 32 at each of its upper corners for lifting and placing in position for transport.

As seen in FIG. 2, the bulk bag container 10 after being filled with bulk has been rested upon a pallet 34 which is common in the art, but not necessary to this invention, so that it may be lifted and moved elsewhere in a warehouse, plant, or the like.

The bulk bag container 10 serves as an outer fabric container for the bulk contained within bulk space 27. For use according to the present invention, this type of a bulk bag container further comprises an interior polypropylene film liner or a second bulk bag, as a liner 50 consisting of liner walls and a bottom panel 52 as seen for example in FIG. 2. Optionally, the liner may have an upper neck portion or fill spout 28 which would extrude out of the fill opening 26 of the bulk bag container 10 and surround the filler spout 25 so that any contents poured within the liner 50 would come to rest in the liner of the bulk bag container. Preferably, the liner is attached within the bulk bag container to the outer fabric bag 12 on the four sides 14, 16, 18 and 20 along the first end of the four sides 66, at the top setting seam 13. The top setting seam 13 is where the four side panels, the liner and the top panel are combined and sewn together. Sewing in the liner allows for air to evacuate through the thread holes in the liner, thereby eliminating bulk bag instability because of air pillowing, and allowing for the stacking of bulk bag containers when filled. As seen in the FIGURES, since in fact the bulk bag container 10 would be the type of bulk bag that would release its contents from a discharge outlet 29 as seen in FIG. 4, liner 50 would have a lower neck portion 54 which would extrude out from the discharge outlet 29 of the bulk bag container 10, so that as the contents pour from the bulk bag container 10 they would pour from discharge spout 54 of the liner into a receiving bin for storage after transport. Optionally, the liner 50 may not have a discharge spout 54 and then the liner bottom may be attached within the bulk bag container 10 to the outer fabric bag 12 at the seam around the discharge outlet 29.

The polypropylene film liner may be affixed within the bulk bag container by stitching (same as sewing) or adhesive. Preferably, the polypropylene film liner 50 is attached within the bulk bag container by sewing along the top setting seam 13 between the top panel 24 and the four side panels. Similar means of liner attachment at other locations by sewing are contemplated. Optionally, glue may be applied as an attachment or adhesion means of adhering the liner within the bulk bag. It should be noted that the adhesion between the inner liner 50 and the outer fabric bag 12 is usually accomplished by stitching, and there is no need for glue, taping or other contact means between the liner and the bag. Optionally, the liner 50 may also be attached to the bottom panel by stitching at the seam around the discharge outlet 29. Therefore, upon contents 80 being poured into the bag and out of the bag as seen in FIG. 4, the removal of the contents will not allow slippage of the interior liner 50 but it will be retained in place during the removal process.

The polypropylene film liner within the bulk bag container 10 is larger in size than the outer fabric bag 12 so as to allow for complete filling and stretching of the bulk bag container to occur. Substitutes for the polypropylene film liner can be a second bulk bag of the same size or larger than the outer fabric bag 12, resulting in a bulk bag container having a inner bulk bag within an outer bulk bag. The second bulk bag or inner bulk bag can be identical to the outer fabric bag 12 in shape, size and material, and is made herein of woven polypropylene, and may be sealed by a coating of polypropylene or by laminated polypropylene. The second bulk bag may have a fill spout and a discharge spout as described herein for the polypropylene film liner. The second bulk bag is attached to the outer fabric bag 12 the same as described herein for the polypropylene film liner. Use of two bulk bags to make a bulk bag container allows for the use of lighter fabrics and materials, such as two bulk bags both made of 3 ounce/square yard woven polypropylene instead of with 5.5 ounce/square yard woven polypropylene and a 3.7 mil (0.001 inch) polypropylene film liner. Bulk bag containers made this way prove to have greater strength and physical properties than bulk bag containers made of woven polypropylene fabric and a polypropylene film liner. This results in greater reusability and a longer bulk bag container life cycle.

The bulk bag container 10 of this invention is completely composed of polypropylene, based on the use of woven polypropylene fabric, polypropylene film, polypropylene thread, and polypropylene fabric loops, thus resulting in a completely recycleable polypropylene product.

In an embodiment of the invention, a bulk bag may be completely composed of polyethylene. Substituting polyethylene for the polypropylene teachings above, a bulk bag container 10 completely composed of polyethylene, based on the use of woven polyethylene fabric, polyethylene film, polyethylene thread, and polyethylene fabric loops, thus resulting in a completely recycleable polyethylene product can be made. A recycleable polyethylene bulk bag will have similar strength to a recycleable polypropylene bulk bag of the same fabric weight and dimensions.

EXAMPLES

Example 1

This example exemplifies the construction materials used to make an embodiment of this invention, namely a recycleable polypropylene bulk bag container for 1000 lbs. of bulk materials. The approximate dimensions of the container between the seams is 35.25 inches long, 35.25 inches wide, and a diameter of 42 inches.

The outer bulk bag is one ply 5.5 oz./sq. yd. uncoated hemmed woven polypropylene, ultraviolet treated, with a filler cord in the top setting seam to prevent leakage and to allow air to evacuate from the liner, a top chute seam and a top chute setting seam. The top panel of the outer bulk bag is one ply 3.0 oz./sq. yard hemmed woven polypropylene, ultraviolet treated, and coated with 1.0 mil polypropylene.

The lift straps are made of polypropylene and extend 10 inches above the top bag seam, and are attached to the outside of the bulk bags and drop 2 inches below the top bag seam. The straps typically stand up and four straps are attached, one at each corner of the bag.

The fill spout is 14 inches in diameter, 19 inches long, and is made of 3.0 oz./sq. yd. hemmed woven polypropylene, ultraviolet treated, and coated with 1.0 mil polypropylene.

The discharge spout is 14 inches in diameter, 19 inches long, and is made of 3.0 oz./sq. yard hemmed woven polypropylene, ultraviolet treated, and coated with 1.0 mil polypropylene.

The fill spout and discharge spout both have web ties or tie strings to close the spout. The discharge spout is covered by a protective square flap of woven polypropylene.

The liner within the bulk bag is 3.7 mil polypropylene film. The liner dimensions are 38.25 inches long, 38 inches wide, and a diameter of 77 inches. The top of the liner is sewn into the top setting seam of the bulk bag. Optionally, the liner is secured within the bulk bag by glue lines on opposite side panels of the bulk bag. Liners are tabbed into the top and bottom of each side seam.

Example 2

This comparative example discloses the physical property advantages of a polypropylene (PP) liner over known polyethylene (PE) liners, besides the previously discussed recycleability advantage of a polypropylene liner.

|  | ASTM Method | 1.5 mil PE | 1.0 mil PP |
|---|---|---|---|
| Melt Index | D 1238 | 1.0 | 0.8 |
| Density g/cc | D 1505 | 0.918 | 0.89 |
| Tensile at yield | | | |
| Machine direction | | 1690 | 1700 |
| Cross direction | | 1760 | 1100 |
| Elmandorf Tear | D 1922 | | |
| Machine direction | | 600 | 460 |
| Cross direction | | 830 | 460 |
| Dart Impact | D 1709 (A) | 400 | 680 |
| | D 4272-83 | — | 680 |
| Moisture Vapor Transmission Rate at 100° F. and 100% RH, g/100 sq. inch/ 24 hour | E-96-66 | 1.485 (1 mil) | 1.3 |

Example 3

This example exemplifies the construction materials which may be used to make an embodiment of this invention, namely a recycleable polyethylene bulk bag container for 1000 lbs. of bulk materials. The approximate dimensions of the container between the seams is 35.25 inches long, 35.25 inches wide, and a diameter of 42 inches.

The outer bulk bag is one ply 5.5 oz./sq. yd. uncoated hemmed woven polyethylene, ultraviolet treated, with a filler cord in the top setting seam, a top chute seam and a top chute setting seam to prevent leakage and to allow air to evacuate from the liner. The top panel of the outer bulk bag is one ply 3.0 oz./sq. yard hemmed woven polyethylene, ultraviolet treated, and coated with 1.0 mil polyethpylene.

The lift straps are made of polyethylene and extend 10 inches above the top bag seam, and are attached to the outside of the bulk bags and drop 2 inches below the top bag seam. The straps typically stand up and four straps are attached, one at each corner of the bag.

The fill spout is 14 inches in diameter, 19 inches long, and is made of 3.0 oz./sq. yd. hemmed woven polyethylene, ultraviolet treated, and coated with 1.0 mil polyethylene.

The discharge spout is 14 inches in diameter, 19 inches long, and is made of 3.0 oz./sq. yard hemmed woven polyethylene, ultraviolet treated, and coated with 1.0 mil polyethylene.

The fill spout and discharge spout both have web ties or tie strings to close the spout. The discharge spout is covered by a protective square flap of woven polyethylene.

The liner within the bulk bag is 3.7 mil polyethylene film. The liner dimensions are 38.25 inches long, 38 inches wide, and a diameter of 77 inches. The top of the liner is sewn into the top setting seam of the bulk bag. Optionally, the liner is secured within the bulk bag by glue lines on opposite side panels of the bulk bag. Liners are tabbed into the top and bottom of each side seam.

A recycleable polyethylene bulk bag made by this example will have similar overall strength compared to a recycleable polypropylene bulk bag made by Example 1.

I claim:

1. A recycleable polypropylene bulk bag container comprising:

(a) an outer bag of woven polypropylene fabric having walls, a top panel, and a bottom panel;

(b) an inner polypropylene film liner without a top panel consisting of walls and a bottom panel, the liner being larger in size than the outer bag and joined to the outer bag in a top setting seam; and (c) polypropylene lifting means attached to the walls.

2. The recycleable bulk bag container of claim 1 wherein the outer bag has a fill spout.

3. The recycleable bulk bag container of claim 2 wherein the outer bag has a discharge spout.

4. The recycleable bulk bag container of claim 1 wherein the inner polypropylene film liner is joined in the top setting seam by sewing.

5. A recycleable polypropylene bulk bag container comprising:

(a) an outer bag of woven polypropylene fabric having walls, a top panel, and a bottom panel;

(b) an inner bag of woven polypropylene fabric without a top panel consisting of walls and a bottom panel, the inner bag being larger in size than the outer bag and joined to the outer bag in a top setting seam; and (c) polypropylene lifting means attached to the walls of the outer bag.

6. The recycleable bulk bag container of claim 5 wherein the outer bag has a fill spout.

7. The recycleable bulk bag container of claim 6 wherein the outer bag has a discharge spout.

8. The recycleable bulk bag container of claim 5 wherein the inner bag of woven polypropylene fabric is joined in the top setting seam by sewing.

9. The recycleable bulk bag container of claim 6 wherein the outer bag has a discharge spout.

10. The recycleable bulk bag container of claim 9 wherein the outer bag has a fill spout.

11. The recycleable bulk bag container of claim 10 wherein the outer bag has a discharge spout.

12. The recycleable bulk bag container of claim 11 wherein the inner polyethylene film liner extends out the outer bag discharge spout.

13. The recycleable bulk bag container of claim 9 wherein the inner polyethylene film liner is joined in the top setting seam by sewing.

14. A recycleable polyethylene bulk bag container comprising:

(a) an outer bag of woven polyethylene fabric having walls, a top panel, and a bottom panel;

(b) an inner bag of woven polyethylene fabric without a top panel consisting of walls and a bottom panel, the inner bag being larger in size than the outer bag and joined to the outer bag in a top setting seam; and (c) polyethylene lifting means attached to the walls of the outer bag.

15. The recycleable bulk bag container of claim 14 wherein the outer bag has a fill spout.

16. The recycleable bulk bag container of claim 15 wherein the inner bag has a discharge spout.

17. The recycleable bulk bag container of claim 15 wherein the outer bag has a discharge spout.

18. The recycleable bulk bag container of claim 14 wherein the inner bag of woven polyethylene fabric is joined in the top setting seam by sewing.

* * * * *